United States Patent [19]

Babetski et al.

[11] Patent Number: 4,751,671
[45] Date of Patent: Jun. 14, 1988

[54] SIZE CONFIGURABLE DATA STORAGE SYSTEM

[75] Inventors: William R. Babetski, Clinton, Mass.; Michael T. Gilmore, North Conway, N.H.

[73] Assignee: Prime Computer, Inc., Natick, Mass.

[21] Appl. No.: 919,795

[22] Filed: Oct. 16, 1986

Related U.S. Application Data

[63] Continuation of Ser. No. 466,327, Feb. 14, 1983, abandoned.

[51] Int. Cl.⁴ .............................................. G06F 13/00
[52] U.S. Cl. ...................................................... 364/900
[58] Field of Search ... 364/200 MS File, 900 MS File

[56] References Cited

U.S. PATENT DOCUMENTS

| | | | |
|---|---|---|---|
| 3,228,005 | 1/1966 | Delmege | 364/200 |
| 4,062,059 | 12/1977 | Suzuki | 364/900 |
| 4,213,177 | 7/1980 | Schmidt | 364/200 |
| 4,271,466 | 6/1981 | Yamamoto | 364/200 |
| 4,447,878 | 5/1984 | Kinnie et al. | 364/200 |

Primary Examiner—David Y. Eng
Attorney, Agent, or Firm—Wolf, Greenfield & Sacks

[57] ABSTRACT

A size configurable data storage system that comprises a plurality of main storage buffers and a like plurality of input data buffers with the main storage buffers and input data buffers being interconnected by respective data busses. The data storage system is preferably a FIFO (first-in-first-out) system employing random access memories for storage. To accommodate different word width inputs to the input data buffers, there are provided a plurality of inter-bus buffers which individually intercouple between predetermined data busses. There is also provided a controller which includes an inter-bus buffer control circuit for controlling enabling of the inter-bus buffers in predetermined sets to enable at least one thereof when less than the full width of the main storage buffer is being entered. When a full width word is to be stored then all inter-bus buffers are inhibited providing direct data transfer from all input data buffers to the main storage buffers. The system controller also includes a main storage buffer select circuit for selectively enabling a pattern of main storage buffers under control of an input size control signal. Also included are output data latches which are brought into operation for the reading of data from the RAM storage buffers. Stored data is read out of the main storage buffers in full word widths and the data is then read out of the output data latches in individual word widths. Logic is also included for sensing when the FIFO is full or empty.

7 Claims, 5 Drawing Sheets

SIZE CONFIGURABLE DATA STORAGE SYSTEM

This application is a continuation, of application Ser. No. 466,327, filed Feb. 14, 1983 now abandoned.

BACKGROUND OF THE INVENTION

The present invention relates in general to a data storage system, and pertains, more particularly, to a size configurable data storage system. In the disclosed embodiment described hereinafter, the invention is embodied in the form of a size configurable FIFO (first-in-first-out) storage buffer and including associated FIFO controls.

In computer systems and other data processing systems, it may be desirable to monitor large numbers of digital signals. One problem that has been encountered in carrying out this monitoring is that it is sometimes difficult to estimate the width and depth of the storage buffer that is required. This task is difficult at least in part because the decision as to the width and depth of the storage buffer is largely dependent upon the particular application.

Accordingly, it is an object of the present invention to provide an improved data storage system that overcomes the aforementioned problem by providing a storage buffer, the width and depth of which are configurable, so as to maximize effective use of the storage memory capacity.

Another object of the present invention is to provide a size configurable memory storage system that is of relatively uncomplicated construction and which is implemented with minimal cost in comparison to the flexibility obtained.

SUMMARY OF THE INVENTION

To accomplish the foregoing and other objects of this invention, there is provided a size configurable data storage system that comprises a plurality of main storage buffers, and a like plurality of input data buffers with the main storage buffers and input data buffers being interconnected by respective data busses. The data storage system described in further detail hereinafter, is preferably a FIFO (first-in-first-out) system employing random access memories for storage. To accommodate different word width inputs to the input data buffers, there are provided a plurality of inter-bus buffers which individually intercouple between predetermined data busses. In the specific embodiment described in detail hereinafter, a first inter-bus buffer interconnects a first data bus to a third data bus; a second inter-bus buffer interconnects the first data bus with a fifth data bus; a third inter-bus buffer interconnects a second data bus with a fourth data bus; a fourth inter-bus buffer interconnects the second data bus with a sixth data bus; a fifth inter-bus buffer interconnects the third data bus with a seventh data bus; and a sixth inter-bus buffer intercouples the fourth data bus with an eighth data bus. In this example, of course, there are eight input data buffers and eight main RAM (random access memory) storage buffers. There is also provided a controller which includes an inter-bus buffer control means for controlling enabling of the inter-bus buffers to enable at least one thereof when less than the full width of the main storage buffer is being entered. The system controller also includes main storage buffer select means for selectively enabling a pattern of main storage buffers under control of an input size control signal. In the embodiment to be described in detail hereinafter the full word is 256 bits at eight input ports, each of 32 bits, and the system of the invention is adapted to also receive less than full width words of 128 bits (four ports of 32 bits each) or 64 bits (two ports of 32 bits each). The system of this invention preferably also comprises output data buffers or output data latches which are brought into operation for the reading of data from the storage system. Stored data is read out of the main storage buffers in full word widths. The storage buffers are selected during this operation by the storage buffer select control means. The data read out of each storage buffer is loaded into the associated output data latch. The data is then read out of the output data latches in individual word widths, which for the example given, is in a width of one-eighth of the main storage buffer full width. In accordance with the sequence of operation, there are provided write requests including a first write request which disables all inter-bus buffers and enables a set of main storage buffers to cause direct data transfer from a set of input data buffers to a corresponding set of main storage buffers via a lower order set of data busses. Upon a second write request, there is an enabling of a predetermined group of inter-bus buffers along with a second set of main storage buffers to cause data transfer from the set of input data buffers via the enabled inter-bus buffers to the enabled second set of main storage buffers via a higher order set of data busses.

Also, in accordance with the invention, there is provided a method of data storage in which the storage is size configurable and comprises the steps of providing a plurality of main storage buffers and inter-bus buffers, transferring inputted data when of full width directly to the main storage buffers and transferring inputted data when of less than full width in at least two sequences including the transfer of a first set of data directly to a first set of main storage buffers followed by the transfer of a second set of data at the same input ports via inter-bus buffers to a second set of main storage buffers.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Reference is now made to FIGS. 1-5 which together form, in a block diagram, a preferred embodiment if the size configurable data storage system of this invention. This disclosed embodiment is in particular in the form of a size configurable FIFO (first-in-first-out) and associated FIFO controller. The disclosed system may be broadly separated into a data transfer section and a control section.

The main storage memory for the FIFO system is comprised of random access memory (RAM) storage buffers S1-S8. Each of these RAM storage buffers is of conventional design having data input/out lines and address lines. Each of the storage buffers also has read and write control inputs to be described in further detail hereinafter.

In addition to the RAM storage buffers, the data transfer section also includes input data buffers IB-1-IB8, output data latches DL1-DL8, and inter-bus buffers B1-B6. From a data transfer standpoint, the input data at ports P1-P8 couples to the input data buffers IB1-IB8. There are provided, eight data busses DB1-DB8 which interconnect the input data buffers with the inter-bus buffers, the RAM storage buffers, and the output data latches. In the drawing, the outputs from the output data latches DL1-DL8 are schematically represented as transitioning through a parallel-to-serial conversion to provide the output data. In the particular embodiment described herein, each of the data busses DB1-DB8 is of 32 bits, thus providing a maximum word storage of 256 bits (32×8). There is also illustrated the address bus AB which is coupled in common to each of the address inputs of the respective RAM storage buffers S1-S8.

The inter-bus buffers B1-B6 are instrumental in controlling data transfer as a function of the desired size configuration. Examples are given hereinafter which describe the control of these inter-bus buffers depending upon selected size configuration. These inter-bus buffers B1-B6 are of conventional design, each including a control input with the control inputs coupling from the data mapping controller 10 at control lines C1-C3. As far as inter-bus data transfer is concerned, the buffer B1 is for data transfer from data bus DB1 to data bus DB3. The buffer B2 is for data transfer from data bus DB1 to data bus DB5. The buffer B3 is for data transfer from data bus DB2 to data bus DB4. The buffer B4 is for data transfer from data bus DB2 to data bus DB6. The buffer B5 is for data transfer from data bus DB3 to data bus DB7. Finally, the buffer B6 is for data transfer from data bus DB4 to data bus DB8.

With regard to the transfer of data into the input data buffers IB1-IB8, there is provided an input data strobe signal on data line 15 which couples to an input data strobe terminal of each of these input data buffers. The input data strobe signal controls the latching of data into each of the input data buffers. With regard to transfer of data out of the input data buffers IB1-IB8, signals are provided from the input data controller 20 on lines G1-G8, which lines couple, respectively, to control inputs of the input data buffers IB1-IB8. These input data control signals simply control the transfer of data from the input data buffers to the RAM storage buffers directly or to the RAM storage buffers by way of rhe inter-bus buffers.

The output data latches DL1-DL8 have a form of control similar to that described in connection ith the input data buffers. There is provided a READ STROBE signal which couples in common to each of the output data latches for reading data from the respective RAM storage buffers into each of these latches under control of this READ STROBE signal. It is noted that, in addition to the READ STROBE signal coupling in common to each of the output data latches, it also couples in common as the read signal for each of the RAM st urage buffers S1-S8. With regard to data transfer out of the o tput data latches, there is provided the output data control logic 25 which is discussed in further detail hereinafter out is shown in the drawing as including separate lines coupleing respectively, to each of the output data latches for enabling the latches to permit output data transfer. These output control lines are identified as signal lines H1-H8.

Figure 1:
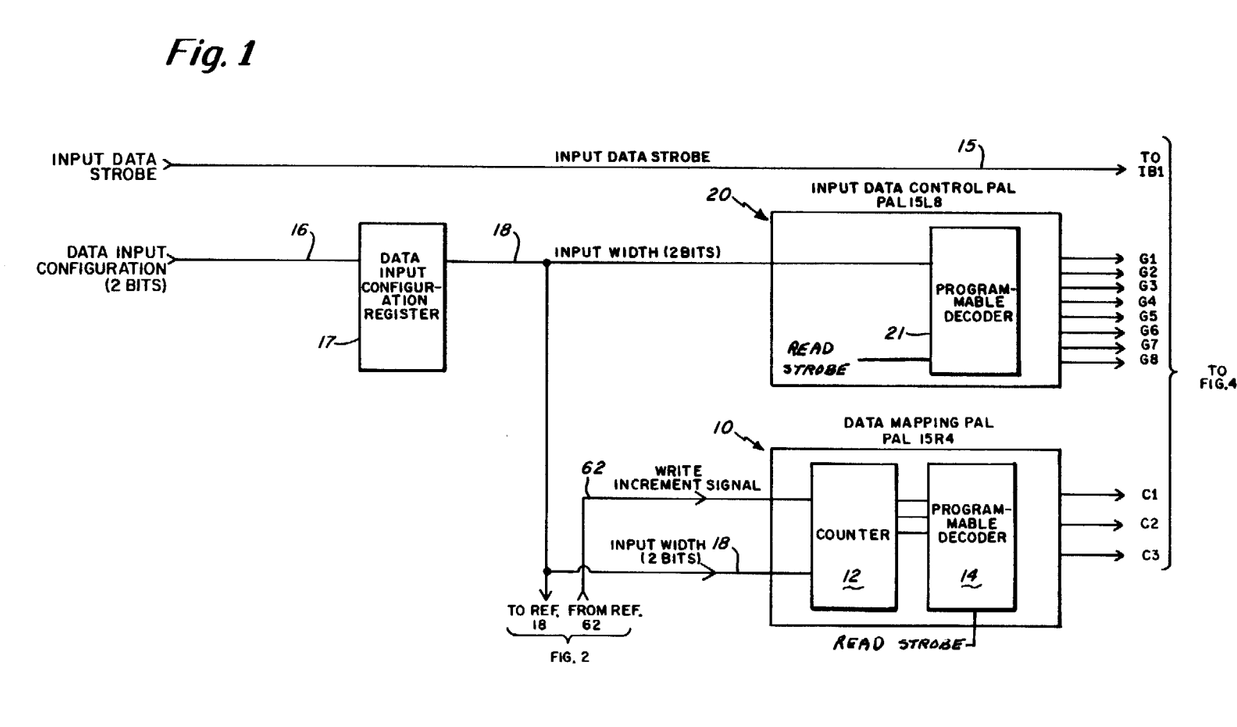
FIGS. 1-5 show a complete block diagram for a preferred embodiment of the size configurable data storage system of this invention.
Figure 2:
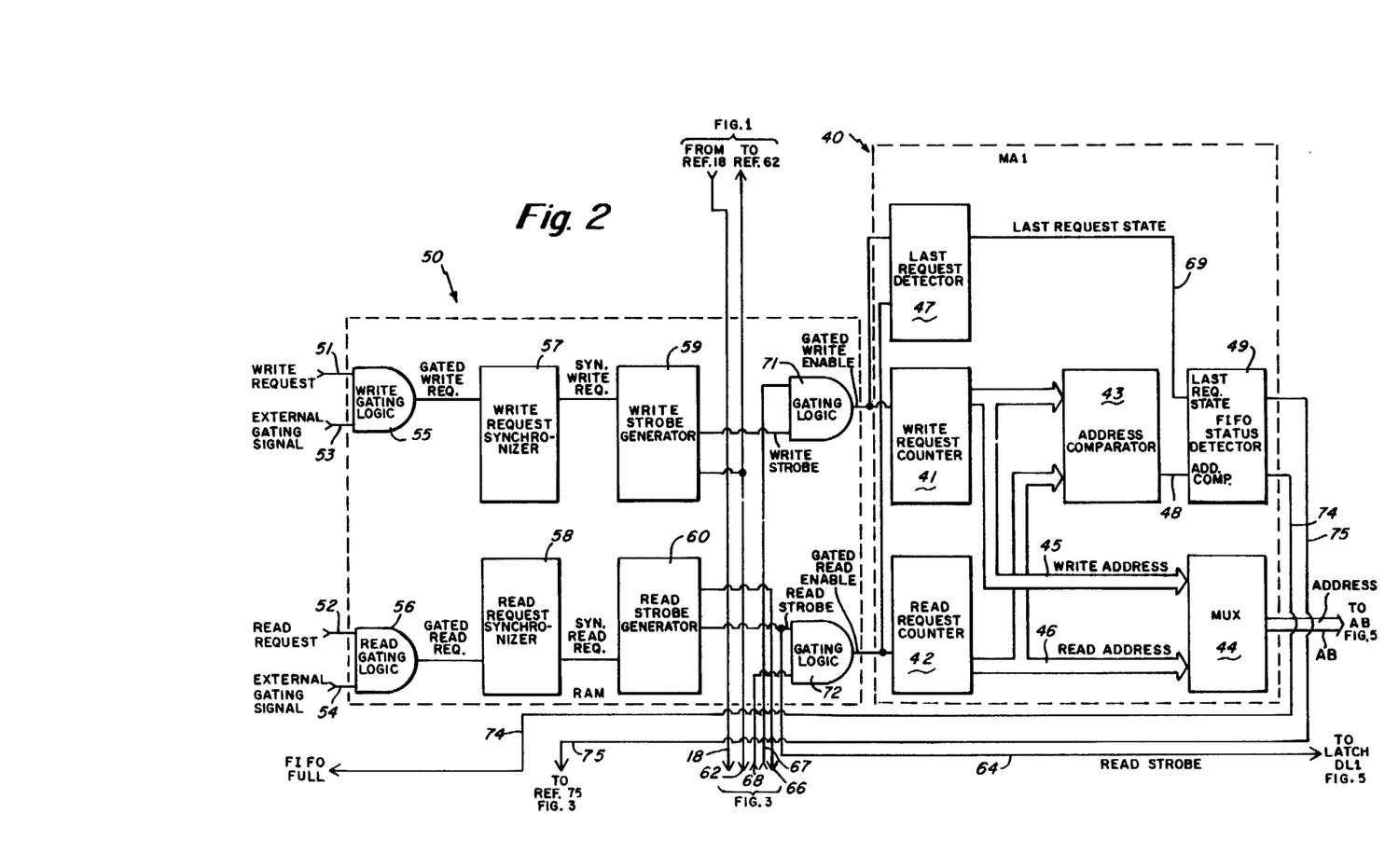
Figure 3:
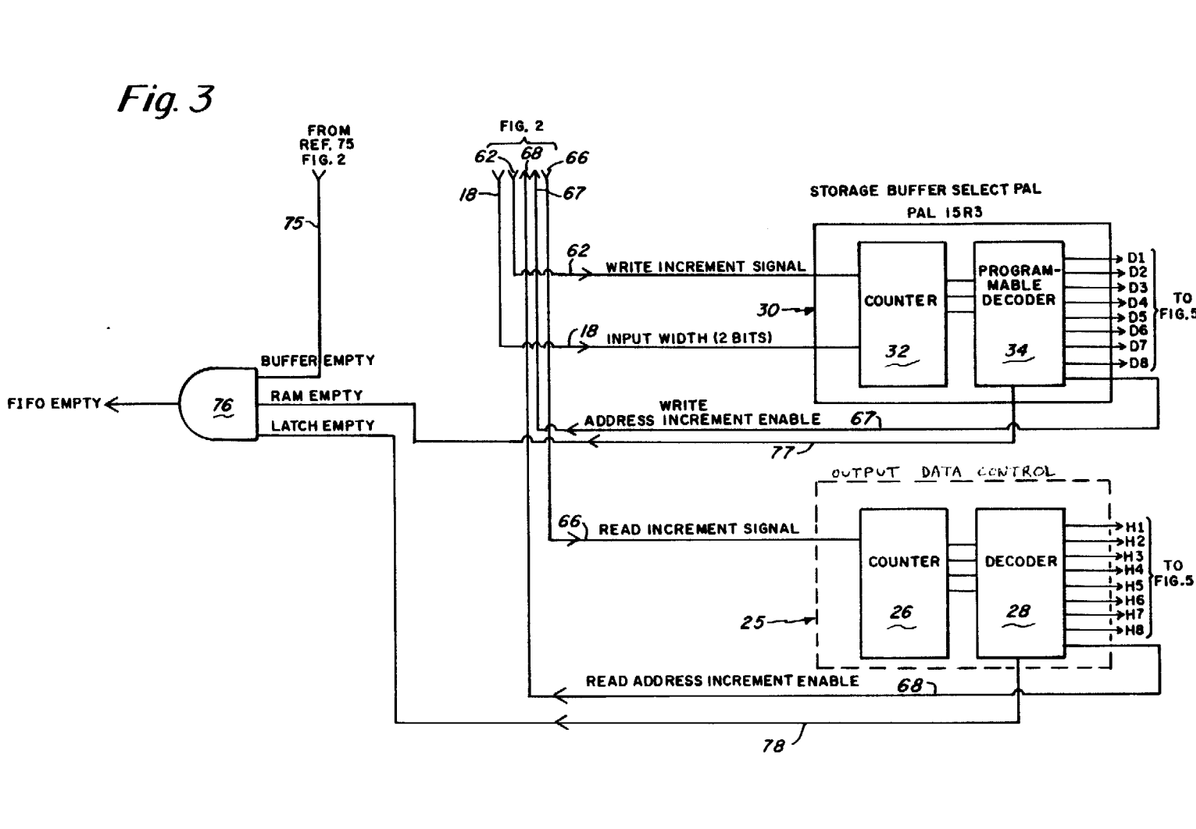
Figure 4:
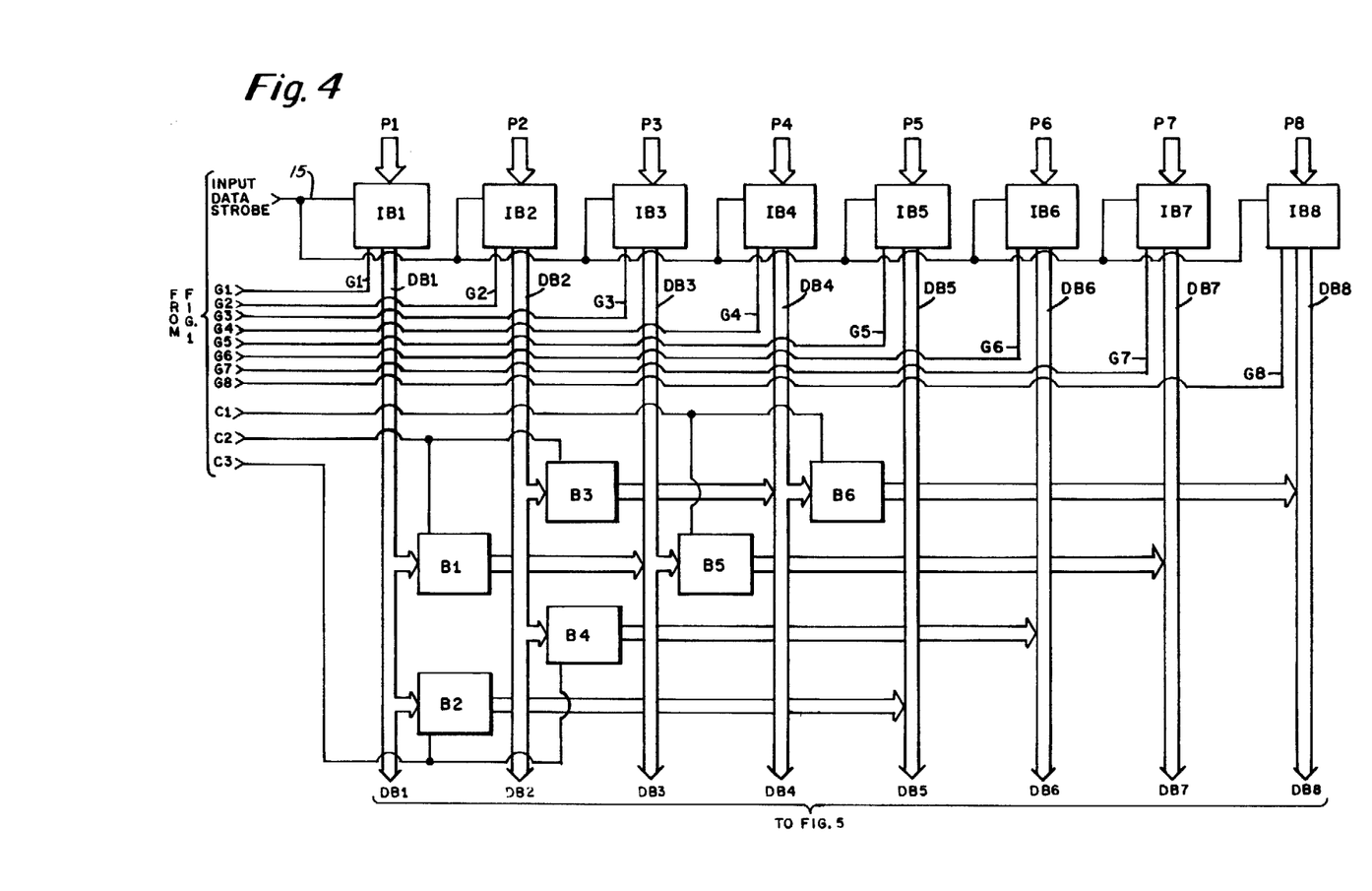

It is noted that the READ STROBE signals also couple to the decoders 21 and 14 in FIG. 1. The READ STROBE signal disables all of the outputs of the decoder during a read cycle.

With regard to the RAM storage buffers S1-S8, there are separate lines coupling to each of the storage buffers for controlling the writing of data into each of the buffers. These lines are identified as signal lines D1-D8 corresponding, respectively, to RAM storage buffers S1-S8. These are control lines coupled from the storage buffer select logic 30.

Figure 5:
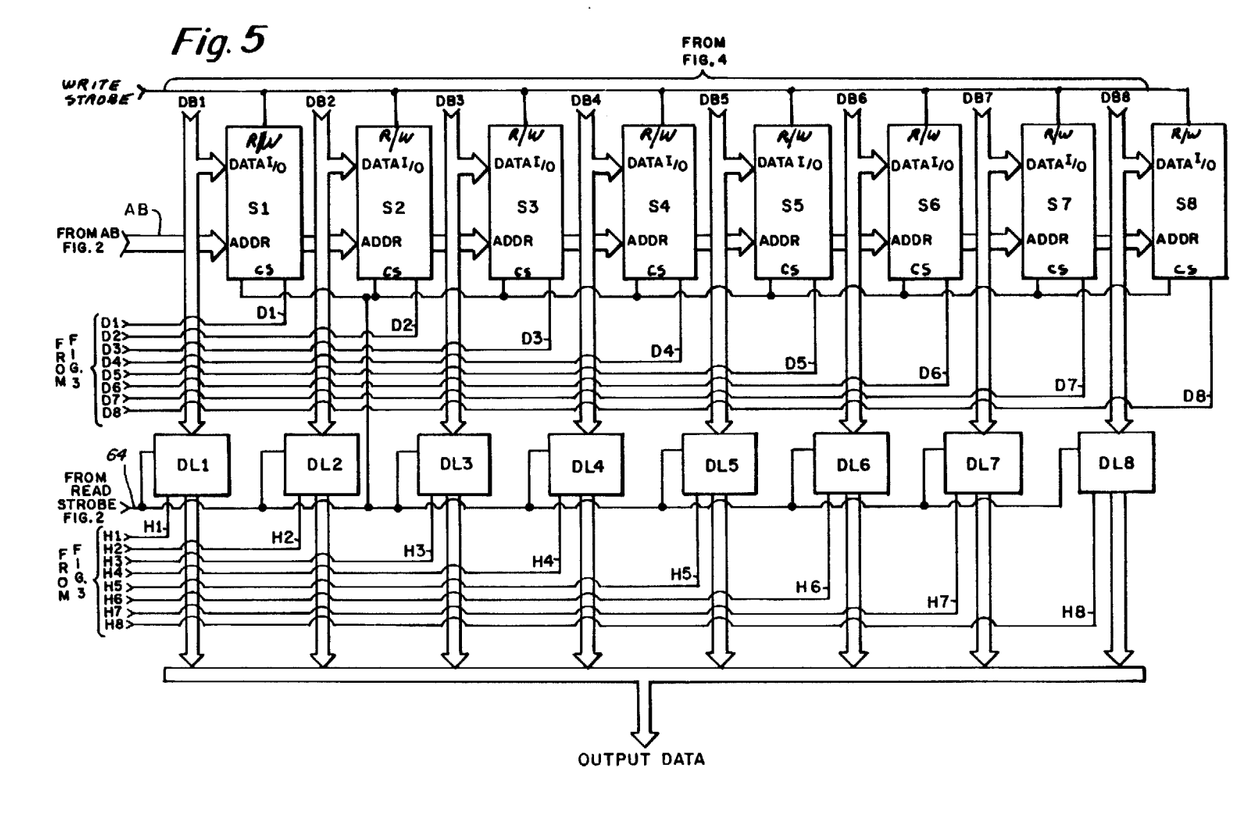

With regard to the system and in particular, FIG. 5, it is noted that the buffers S1-S8 may be selected by either one of the select lines D1-D8 or with the READ STROBE signal on line 64. Although this is an OR function, for the sake of simplicity, both lines are shown connecting to the buffers. These lines are designated as chip select lines. The WRITE STROBE signal couples in common to the read/write input of the buffers S1-S8. This provides a form of control in which the outputs from the buffers are only active during a read sequence.

Having now described the interconnecrions with regard to the data transfer section of the system, reference is now made to the control section. Reference has been made in the control section previously to parts thereof such as the data mapping logic 10, the input data controller 20, the output data control logic 25, and the storage buffer select logic 30. The control section also comprises read/write controller 40 and read/write control logic 50.

As indicated previously, there is provided an input data strobe line 15 which couples in common to a clocking input of each of the conventional input data buffers. This may be a periodic signal that provides for the lathing of data from the input ports P1-P8 into the respective data input buffers IB1-IB8 In addition to the input data strobe, there is also provided a data input signal on line 16 that couples to a data input configuration register 17. The register 17 may be of conventional design and is simply a storage register for storing the input data on line 16 and preventing this data on the output line 18. Although, in the drawing, many of the lines that are shown are represented as single lines, at least some of these lines may be multiple lines and in the case of data lines 16 and 18, these are two-bit lines with the two bits of data being used to represent the different width words desired. Considering that each input data buffer stores 32 bits, there are thus a total of 256 bits ror a full word. For a half word, there are thus 128 bits and ror a one-fourth word, there are 64 bits. The two-bit output signal on line 18 is a binary signal that is indicative of the desired word width also referred to herein as the size configuration. This signal couples to the input data controller 20, the data mapping logic 10, and also to the storage buffer select logic 30.

The input data controller 20 is implemented in programmable array logic (PAL) functioning as a programmable decoder 21 that receives the data input configuration signal on line 18 and provides multiple outputs as signals G1-G8 depending upon the desired sequencing of operation of the input data buffers as a function of the data input configuration signal on line 16. Hereinafter is a description of the design parameters for the input data controller 20. Also, hereinarter are provided examples of operation in connection with different width words and the control provided by way of the input data controller.

In the control section, there are also shown other input control signals, and also a pair of output signals for indicating whether the FIFO is empty or full. The input control signals include a WRITE REQUEST signal on line 51 and a READ REQUEST signal on line 52. There are also provided respective EXTERNAL GATING signals on lines 53 and 54. These signals are coupled to the read/write control logic 50 which comprises write gating logic 55 and read gating logic 56 along with write request synchronizer 57, write strobe generator 59, and read request synchronizer 58 and read strobe generator 60. The output of the write gating logic 55 is referred to as a gated write request signal which is coupled to the write request synchronizer 57. The synchronizer 57 may comprise a flip-flop. Similarly, the output of the read gating logic 56 is referred to as a gated read request signal which couples to the read request synchronizer 58 which may also be comprised of a flip-flop. The output of the write request synchronizer couples to the write strobe generator for providing at the output thereof, two write control type signals including the WRITE STROBE signal and the WRITE INCREMENT signal. Similarly, the output of the read request synchronizer 58 couples to the read strobe generator and provides at the output thereof, two read control signals including the READ STROBE signal and the READ INCREMENT signal. Both the write strobe generator and the read strobe generator may also comprise a flip-flop or both the synchronizer and generator for either the write or read channels may be implemented by a single flip-flop.

The WRITE INCREMENT signal at line 62 couples to both the data mapping logic 10 and the storage buffer select logic 30. The data mapping logic 10 is shown in further detail in the drawing as comprising a counter 12 and a programmable decoder 14. The counter 12 and decoder 14 are preferably implemented by a programmable array logic (PAL), the design of which is discussed in further detail hereinafter. The signal on line 62 is in essence an enable signal for enabling the counter 12. The other signal on line 18 which is the data input configuration signal controls the counter 12 so that the counter sequences through a predetermined count which is a function of the signal on line 18. The programmable decoder 14 decodes the output of the counter 12 and provides the aforementioned signals C1-C3 for control of the inter-bus buffers B1-B6.

It is noted that the same signals that couple to the data mapping logic 10, also couple to the storage buffer select logic 30. In fact, the logic 30 also includes a counter 32 and a programmable decoder 34. Once again, the counter and decoder are preferably implemented in programmable array logic (PAL), the design of which is disclosed in further detail hereinafter. As with the data mapping logic 10, the storage buffer select logic 30 has its counter 32 enabled by means of the WRITE INCREMENT signal and has the counter controlled by means of the signal on line 18 which controls the width of data transfer. The programmable decoder 34 generates the eight control signals D1-D8 which control the transfer of data into the RAM storage buffers S1-S8, respectively.

With regard to the outputs from the read strobe generator 60, it is noted that there is a READ STROBE signal which is coupled to the read/write controller 40 and also coupled to the output data latches DL1-DL2 and RAM storage buffers S1-S8. The READ STROBE signal line 64 couples in common to the output data latches DL1-DL8 and also in common to the RAM storage buffers S1-S8. This signal is a latching signal that conditions the RAM storage buffers and output data latches for the transfer of data from the RAM storage buffers to the output data latches. The data stored in the RAM storage buffers is read out of these storage buffers in full words widths with all eight RAM storage buffers being read out of at once. Again, reference is made to the common read strobe line 64. As indicated previously, RAM storage buffers are selected during this read operaton by the READ STROBE signal. The data read out of each RAM storage buffer is loaded into the associated output data latch. The read address presented to the individual RAM storage buffers is then incremented so as to prepare the RAM storage buffers for transfer of the next word. Data is then read out of the data output latch DL1-DL8 in accordance with the desired word width. In this connection, reference is made to the output data control logic 25 which may be implemented by a programmable array logic but is described in the preferred embodiment as simply comprising a counter 26 and a decoder 28. The outputs of the decoder 28 are the aforementioned control signals H1-H8 for controlling data transfer out of the output data latches DL1-DL8 in accordance with the desired width. The counter 26 receives the other output from the read strobe generator 60, namely the READ INCREMENT signal on line 66. As with the WRITE INCREMENT signal on line 62, the READ INCREMENT signal is an enable signal for the counter 26. The counter 26 transitions through a count sequence once enabled. The decoder 28 simply decodes the output of the counter 26 to provide sequencial, mutually exclusive, signals H1-H8. The manner of signal generation is discussed hereinafter with regard to specific examples that are given.

The read/write controller 40 comprises a write request counter 41, a read request counter 42, an address comparator 43, and an address multiplexer 44. There is also shown the write address bus 45 and the read address bus 46.

The control of the write request counter 41 is from gating logic 71 while the control of the read request counter 42 is from gating logic 72. The gating logic 71 receives the previously mentioned WRITE STROBE signal. The gating logic 72 receives the previously mentioned READ STROBE signal. In addition, the gating logic 71 receives the write address INCREMENT ENABLE signal which is an output signal from the programmable decoder 34. In an actual implementation, the WRITE ADDRESS INCREMENT ENABLE signal may be the output D8. Thus, the gating logic 71 provides for clocking of the write request counter 41 from the WRITE STROBE signal but only as long as the WRITE ADDRESS INCREMENT ENABLE signal has also been generated. The WRITE ADDRESS INCREMENT ENABLE signal on line 67 is generated from the programmable decoder 34 and is asserted at the end of the counting sequence when the last RAM storage buffer is being written into. This essentially indicates the completion of a write sequence and at that time the gating logic 71 is asserted to provide at the output thereof, the GATED WRITE ENABLE signal which couples to the write request counter 41 and the previous request detector 47.

Now, with respect to the gating logic 72, there is provided, in addition to the READ STROBE signal, from the read strobe generator 60, the READ ADDRESS INCREMENT ENABLE signal on line 68 which couples from the decoder 28. The signal on line 28 is generated in a similar manner to the signal of line 67 and provides an enabling signal from the output of the decoder 28 when a reading sequence has been completed with all output data latches having been read from. When this signal is asserted, the gating logic 72 is activated and there is provided at the output thereof, a GATED READ ENABLE signal which couples to both the read request counter 42 and the previous request detector 47.

Thus, assuming a write sequence, when the gating logic 71 is asserted, the counter 41 increments and a new write address is presented on the write address bus 45. Similarly, for a read sequence, when the gating logic 72 is asserted, the read request counter 42 is incremented so as to provide a new read address on the read address bus 46. Both the read and write address busses couple to the multiplexer 44 which simply selects one or the other address which is coupled to the output address bus AB.

The write address bus 45 and the read address bus 46 also couple to the address comparator 43. A comparison is detected when the FIFO is either full or empty. The comparison signal is coupled on line 48 to the FIFO status detector 49. As noted in the drawing, there is also a connection on line 69 from the previous request detector 47 to the FIFO status detector 49. The previous request detector 47 may be a storage register that simply records the last gated enable signal as to whether it was a read or write signal.

Thus, the FIFO status detector 49 has two inputs, one on line 48 from the address comparator which is asserted if the storage buffer is either full or empty. The signal on line 69 discriminates between the full and empty condition. Thus, if the last or previous request from the detector 47 was a write request indicated on line 69, this indicates a full condition for the storage buffer. On the other hand, when a comparison is indicated, if the last request was a read, then the storage buffer is considered empty. In this connection, it is noted that there is an output signal on line 74 which is indicative of a full FIFO. The other signal on line 75 from the detector 49 couples to the gating logic 76 as one input thereto. This indicates a buffer empty condition. In addition, there are two other signals coupled to the gating logic 76, one on line 77 from the programmable decoder 34 and the other on line 78 from the decoder 28. With respect to the storage buffer select logic 30, when all of the RAM storage buffers have been written into in a sequence, then the RAM EMPTY signal is generated from the programmable decoder 34. In an actual implementation, the RAM EMPTY signal may be the output D1. The signal on line 77 is present at the end of a counting sequence demarcated by counter 32 with their being a decoded output on line 77 from the decoder 34 coupled to the gating logic 76. Similarly, there is an output from the decoder 28 on line 78. This signal is the LATCH EMPTY signal and is indicative of the counter 26 having terminated its counting sequence thus indicating transfer out of all of the output data latches. In an actual implementation the LATCH EMPTY signal may be the output H1. Upon the occurrence of all three input signals to the gating logic 76, then the FIFO empty signal is generated as indicated.

In order to understand the operation of the size configurable data buffer storage system of this invention, reference is now made to different example showing the transfer of data of different widths of the input data word.

EXAMPLE I

In this example, the width of the input data word is the full width of the main storage buffer as comprised of RAM storage buffers S1-S8. In this configuration, the state of the input width signal on line 18 conditions the input data control logic 20, the data mapping logic 10, and the storage buffer select logic 30. For the full width configuration the outputs of all of the input data buffers IB1-IB8 are enabled. Thus, the signals G1-G8 are all concurrently provided and the data is presented from each input data buffer on the respective data busses DB1-DB8. The data mapping logic is controlled during this mode of operation so that none of the signals C1-C3 are present. This thus means that none of the inter bus buffers B1-B6 are enabled. On the other hand, all of the RAM storage buffers S1-S8 are selected from the storage buffer select logic 30. This means that during this write sequence, the signals D1-D8 are all asserted. Thus, each time that a write request is made to the system at input line 51, a full word of input data is written into the main storage buffer in parallel. This transfer takes place from each input data buffer such as data buffer IB1 via data bus DB1 into the RAM storage buffer S1. Upon a write request, this transfer occurs provided that the main storage buffer is not full. In this connection, reference has been made previously to the means of detection of the FIFO being full and empty. In this configuration, the WRITE ADDRESS INCREMENT ENABLE signal on line 67 is always active and allows the write request counter 41 to be incremented so as to then present the next write address for subsequent storage in the RAM storage buffers S1-S8.

The stored data is read out of the main storage buffer in full word widths from all eight RAM storage buffers S1-S8 at once. In this connection, note the READ STROBE signal on line 64, that couples in common to the read input of each of the RAM storage buffers. The data being read out of each RAM storage buffer is loaded into the associated output data latch DL1-DL8. The read address presented to individual RAM storage buffers is then incremented under control of the read increment signal on line 66 which causes incrementing of the read request counter 42 so as to present a new read address. Data is then read out of the output data latches DL1-DL8 in individual word widths which for this example, means that all signals H1-H8 are asserted in mutually exclusive sequence so as to provide for transfer to the output data bus. At the output, the transfer is schematically illustrated as being parallel-to-serial, or, alternatively other forms of data manipulation may occur at the output.

EXAMPLE II

In this example, the size of the word being stored at each write request is one-fourth of the full size of the main storage buffer. Thus, considering that each input data buffer stores 32 bits, this means that each transfer will be of 64 bits. In a previous example at a full width, the transfer was 256 bits. For this example, the input data buffers IB1 and IB2 are always enabled and all other input data buffers are disabled. This means that the signals G1 and G2 are asserted but the signals G3-G8 are not asserted. For the first write request, no inter-bus buffers are enabled and the RAM storage buffers S1 and S2 are selected by the storage buffer select logic 30. Thus, on the first write request, the data in input data buffers IB1 and IB2 are transferred directly to the RAM storage buffers S1 and S2. On the second write request, only the inter-bus buffers B1 and B3 are enabled and only the RAM storage buffers S3 and S4 are selected by the storage buffer select logic 30. Thus, at the second write request, the input data at the ports P1 and P2 which is coupled to the input data buffers IB1 and IB2 is now transferred so that the data on data bus DB1 is coupled by way of the inter-bus buffer B1 to the data bus DB3 and from there to the RAM storage buffer S3. Similarly, the output of the data buffer IB2 is transferred from the data bus DB2 by way of the inter-bus buffer B3 to the data bus DB4 and from there to the RAM storage buffer S4. Thus, although on the second write request, new data is presented at the ports P1 and P2, this data, instead of being transferred to the RAM storage buffer S1 and S2, is transferred to the RAM storage buffers S3 and S4.

On the third write request, only the inter-bus buffers B2 and B4 are enabled, along with the RAM storage buffers S5 and S6. The selection of the RAM storage buffers is from the storage buffer select logic and in particular, the aforementioned signals D1-D8. In selecting the RAM storage buffers S5 and S6 thus, only the storage buffer select signals D5 and D6 are asserted and all other signals are not asserted. Thus, for the third write request, the data on data bus DB1 is transferred by way of inter-bus buffer 32 to the data bus DB5 and from there to the RAM storage buffer S5. Similarly, the data on data bus DB2 from port P2 and from the input data buffer IB2 is transferred by way of inter-bus buffer B4 to the data bus DB6 and from there to the RAM storage buffer S6.

On the fourth write request, the inter-bus buffers B1, B3, B5 and B6 are all enabled and the RAM storage buffers S7 and S8 are selected by way of the storage buffer select logic and in particular the selection signals D7 and D8. This form of selection of the inter-bus buffers by way of the signals C1-C3 and the selection provided by the storage buffer select logic 30 by way of signals D1-D8 provide for the following data transfer. The data on bus DB1 is coupled by way of inter-bus buffers B1 and B5 to the data bus DB7 and from there to the RAM storage buffer S7. Similarly, the data on data bus DB2 is coupled by way of inter-bus buffers B3 and B6 to the data bus DB8 and from there to the RAM storage buffer S8.

During the fourth write sequence, the WRITE ADDRESS INCREMENT ENABLE signal on line 67 is active. This signal couples by way of gating logic 71 and allows the write address counter 41 to be incremented at the end of the current write cycle. This presents the next write address to the RAM storage buffers and the process starts over again. During this process, the counters 12 and 32 are cycling to provide the proper sequence of respective signals C1-C3 and D1-D8 as already indicated. Although a write request signal occurs for each segment of the transfer, no address change occurs until the WRITE ADDRESS INCREMENT ENABLE signal occurs which indicates the completion of a counting sequence.

With regard to read requests, the stored data is read out of the main storage buffer as in accordance with the previous example, in a full word width with all eight of the RAM storage buffers being selected at once. The RAM storage buffers S1-S8 are selected during this operation by the storage buffer select logic 30. The data being read out of each RAM storage buffer is loaded into the associated output data latches DL1 and DL8. The read address presented to the individual RAM storage buffers is then incremented. The data is then read out of the output data latches in individual word widths, which for the example given is in a one-eighth width of the main storage buffer width or for the example given in the 32 bit width.

EXAMPLE III

In this example, the size of the word being stored at each write request is one half the full size of the storage buffer or in other words, for the example presented, 128 bits. For this instance, on the first write request, all four input data buffers IB1-IB4 are enabled by way of signals G1-G4 and data transfer occurs directly by way of the data busses DB1-DB4 to the RAM storage buffers S1-S4. The ram storage buffers S1-S4 are selected by means of the selection signals D1-D4. On the second write request, the inter-bus buffers B2, B4, B5 and B6 are activated. Also, the RAM storage buffers S5-S8 are selected. Thus, the data from input data buffer IB1 on data bus DB1 is coupled by way of inter-bus buffer B2 to the data bus DB5 and from there to the RAM storage buffer S5. The data in input data buffer IB2 is transferred by way of the data bus DB2 to the inter-bus buffer B4 and from there to the data bus DB6 and to the RAM storage buffer S6. The data from the input data buffer IB3 on data bus DB3 is transferred by way of the inter-bus buffer B5 to the data bus DB7 and from there to the RAM storage buffer S7. Finally, the data from the input data buffer IB4 on data bus DB4 is coupled by way of the inter-bus buffer B6 to the data bus DB8 and from there to the RAM storage buffer S8. After this sequence has been completed, the address presented to the individual RAM storage buffers is then incremented and the process commences over again. As far as the write sequences are concerned, the process repeats until all data has been entered or until the FIFO is full.

With regard to reading from the FIFO, stored data is read out of the main storage buffer in full word widths from all eight RAM storage buffers S1-S8. The RAM storage buffers are selected during this operation from the storage buffer select logic. The data being read out of each RAM storage buffer is loaded into the associated output data latches DL1-DL8. The read address presented to the individual RAM storage buffers is then incremented. Data is then read out of the output data latches in individual word widths which for the example given is a one-eighth word width of the main storage buffer width.

Reference is also made herein to boolean equations set forth in the following tables I, II and III. Table I is on pages 24-29, table II on pages 30-31 and table II on page 32. These boolean equations define outputs of the storage buffer select logic, the input data control logic, and the data mapping logic. By means of these boolean equations and associated truth tables, one skilled in the art can readily design these PAL's.

Having described one preferred embodiment of the present invention, it should now be apparent to those skilled in the art that numerous other embodiments are contemplated as falling within the scope of the present invention. For example, the number of main storage buffers may be greater or less than the eight described in the preferred embodiment. Also, the RAM data storage buffers may be either loaded in parallel or these buffers may be concatenated to form a narrow/deep storage buffer. Also, several other configurations of these buffers may be employed.

I. BOOLEAN EQUATIONS DEFINING OUTPUTS OF STORAGE BUFFER SELECT LOGIC:

```
DA = -(INIT + -WB* -WA* -QA* -QB* -QC* -QD* -QE* -QF* -QG*QH + WA* -QA* -QB*
     -QC* -QD* -QE* -QF*QG*QH + WB* -QA* -QB* -QC* -QD*QE*QF*QG*QH + WB*
     WA).
DB = -(INIT*WA + -INIT* -WB* -WA*QA* -QB* -QC* -QD* -QE* -QF* -QG* -QH + INIT*
     WP + WA* -QA* -QB* -QC* -QD* -QE* -QF*QG*QH + WB* -QA* -QB* -QC*
     -QD*QE*QF*QG*QH + WB*WA).
DC = -(-INIT* -WB* -WA* -QA*QB* -QC* -QD* -QE* -QF* -QG* -QH + -INIT*WA*QA*
     QB* -QC* -QD* -QE* -QF* -QG* -QH + INIT*WP + WB* -QA* -QB* -QC* -QD*
     QE*QF*QG*QH + WB*WA).
DD = -(-INIT* -WB* -WA* -QA* -QB*QC* -QD* -QE* -QF* -QG* -QH + -INIT*WA*QA*
     QB* -QC* -QD* -QE* -QF* -QG* -QH + INIT*WP + WP* -QA* -QB* -QC* -QD*
     QE*QF*QG*QH + WB*WA).
DE = -(-INIT* -WB* -WA* -QA* -QB* -QC*QD* -QE* -QF* -QG* -QH + -INIT*WA*
     -QA* -QB*QC*QD* -QE* -QF* -QG* -QH + -INIT*WB*QA*QB*QC*QD* -QE* -QF*
     -QG* -QH + WB*WA).
DF = -(-INIT* -WB* -WA* -QA* -QB* -QC* -QD*QE* -QF* -QG* -QH + -INIT*WA*
     -QA* -QB*QC*QD* -QE* -QF* -QG* -QH + -INIT*WB*QA*QB*QC*QD* -QE* -QF*
     -QG* -QH + WB*WA).
DG = -(-INIT* -WB* -WA* -QA* -QB* -QC* -QD* -QE*QF* -QG* -QH + -INIT*WB*QA*
     QB*QC*QD* -QE* -QG* -QH + -INIT*WA* -QA* -QE* -QC* -QD*QE*QF* -QG*
     -QH + WB*WA).
DH = -(-INIT* -WB* -WA* -QA* -QB* -QC* -QD* -QE* -QF*QG* -QH + -INIT*WP*QA*
     QB*QC*QD* -QE* -QF* -QC* -QH + -INIT*WA* -QA* -QE* -QC* -QD*QE*QF*
     -QG* -QH + WB*WA).
```

TRUTH TABLE

```
11-INPUT VARS       8-OUTPUT VARS    158-CUBES

=====================              0X0XXXX11X0  00000000
I                                  010X0XX0YXX  00000000
N                                  0X0X1X0X1XX  00000000
IWWQGQGQGQG  DDDDDDDD          35  0010XX0X0CX  00000000
TBAABCDEFGH  ABCDEFGH              010CXXXXXX0  00000000
=====================              0X00XX1X1XX  00000000
0X0XXXXY101  00000000              001XXXX01XX  00000000
CX0XXX1XX1X  00000000          40  010XX0XXCX  00000000
0X010XXX1XX  00000000              010XXXXCX1X  00000000
0X0X1XXYXX1  00000000              010XXX0XX1  00000000
00X1XX1X*XX  00000000              01010XXXYXX  00000000
0X0X011XYYX  00000000          45  0X0XXXX1XC1  00000000
0101XX0XYXX  00000000              001XXXXXX10  00000000
010XX0X0XYX  00000000              001X0X00XX0  00000000
00X1XXXX1XX  00000000              010XXX00XXX  00000000
001X00XX00X  00000000          50  0X0X10XX1XX  00000000
001X00X0X0X  00000000              00011XYXXXX  00000000
0X00X11XYXX  00000000              00X1XXXXXX1  00000000
0X011X0YXYX  00000000              0X010X1XXXX  00000000
00101YXYYYX  00000000              010XXXX1XX0  00000000
010X1X0XYXX  00000000          55  00XXXXX1X1X  00000000
0X01X10YYXX  00000000              0010Y0X0XX0  00000000
0X0X110YYXX  00000000              0X0XXXX10X1  00000000
0X0XXX110X  00000000               010C1YXXXXX  00000000
0X0011XXXXX  00000000          60  00110XXYYXX  00000000
010X10YYYXX  00000000              00YXX1XXY1X  00000000
0X0X0X1X1YX  00000000              010X0XXXYX0  00000000
0X0110XXXXX  00000000              0X00X1XXJXX  00000000
0X0X01XY1YX  00000000          65  0C1XYXX10XX  00000000
00CYXXX11XX  00000000              0X0XXXXC11X  00000000
001X00X0XX0  00000000              00XYYX11XXX  00000000
010X01XYYXX  00000000              010CX1XYYXX  00000000
```

```
0X001XXX1XX  00000000          0X0XXXX01X1  00000000
01CXXX0X0XX  00000000          0010XX00X0X  00000000
0X001X1XXXX  00000000          010XXXXX01X  00000000
0X01X01XXXX  00000000        5 001X0X0X00X  00000000
001X0X0X0X0  00000000          001X00XX0X0  00000000
010XXXXXX01  00000000          001XX10XXXX  00000000
00X1X1XXXXX  00000000          0X0XX1XXX1X  00000000
010XX10XXXX  00000000       10 000XX11XXXX  00000000
001C00XCX0X  00000000          0X0XXXX0X11  00000000
00XX1X1XXXX  00000000          00XXX1XXXX1  00000000
00XX1XXXXX1  00000000          0X0XXX1XXX1  00000000
010XX01XXXX  00000000       15 01CX0X1XXXX  00000000
0X0X1XXXX1X  00000000          010XX0XX0XX  00000000
0X01XX0X1XX  00000000          0X0XXXX101X  00000000
00XXXX1XX1X  00000000          00XX1XX1XXX  00000000
0X01XXX1XXX  00000000       20 001XX01XXXX  00000000
0X01X0XX1XX  00000000          0X0XXXXX110  00000000
00XX1XXX1XX  00000000          01CCXXX0XXX  00000000
001X0X00X0X  00000000          00X1XXX1XXX  00000000
0X0XX01X1XX  00000000          0010X0XX0X0  00000000
0100XXXX00X  00000000       25 0X0101XXXXX  00000000
00XX11XXXXX  00000000          00X00C00000  00000000
001C00XX00X  00000000          010X0XXX0XX  00000000
00XX1XXXX1X  00000000          0010XX00XX0  00000000
010XXXXX0X1  00000000       30 0X0XXX11XXX  00000000
001XXXXXX01  00000000          010XXXXX10  00000000
00X1XXXXX1X  00000000          010XX0XXX0  00000000
00XXXXXX11X  00000000          0X0XX1X1XXX  00000000
0X0X101XXXX  00000000       35 0X0XXXX1X10  00000000
0101X0XXXXX  00000000          0X01XXXXXX1  00000000
00XXXXX1XX1  00000000          0010X0X0X0  00000000
00XXXXXX11  00000000          100XXXXXXX  10000000
010XXX0XXX0  00000000       40 X00000000C1  10000000
010XXXX0XX  00000000          00010000000  01000000
00XXXXX0X1  00000000          101XXXXXXXX  11000000
010XXX10XX  00000000          X0100000011  11000000
00XXX1X1XXX  00000000       45 00001000000  00100000
00XXXX1XX1  00000000          00000100000  00010000
00XXXX1X1XX  00000000          00111000000  00110000
010XX1XXXX  00000000          X1000001111  11110000
00XX1XX1XX  00000000       50 110XXXXXXXX  11110000
010XX0XXCX  00000000          00000010000  00001000
0X0X1XX1XXX  00000000          00000001000  00000100
0X01XXXX1X  00000000          001001000  00001100
010XXX1X0X  00000000       55 00000000100  00000010
0X0XX1XXXX1  00000000          01011101000  00000010
010X0XXX0X  00000000          00000000010  00000001
0X0XXXX011  00000000          00100001100  00000011
0X00000000  00000000          01011110000  00001111
0X0XX10X1XX  00000000       60 X11XXXXXXXX  11111111
```

EQUATIONS USED TO GENERATE FILE WHICH IS USED TO PROGRAM THE PAL.

NOTE:
OUTPUT DA OF THE ABOVE EQUATIONS = QA OF THE BELOW EQUATIONS.
OUTPUT DB OF THE ABOVE EQUATIONS = QB OF THE BELOW EQUATIONS.
OUTPUT DC OF THE ABOVE EQUATIONS = QC OF THE BELOW EQUATIONS.
OUTPUT DD OF THE ABOVE EQUATIONS = QD OF THE BELOW EQUATIONS.
OUTPUT DE OF THE ABOVE EQUATIONS = QE OF THE BELOW EQUATIONS.
OUTPUT DF OF THE ABOVE EQUATIONS = QF OF THE BELOW EQUATIONS.
OUTPUT DG OF THE ABOVE EQUATIONS = QG OF THE BELOW EQUATIONS.
OUTPUT DH OF THE ABOVE EQUATIONS = QH OF THE BELOW EQUATIONS.

EQUATIONS ARE FOR USE WITH THE "PALASM" PROGRAM SUGGESTED BY
MONOLITHIC MEMORIES, INC., AND ARE IN THE REQUIRED FORMAT.
PAL TYPE: PAL16R8
PIN LIST:
 1     2    3    4    5    6    7    8    9   10   11   12   13   14   15   16   17   18   19   20
CLOCK WB WA /INIT NC NC NC NC NC GND /OE /QH /QG /QF /QE /QD /QC /QB /QA VCC
EQUATIONS:
```
    CA := INIT + /WB* /WA* /QA* /QE* /QC* /QD* /QE* /QF* /QG*QH + WA* /QA* /QB*
                 /QC* /QD* /QE* /QF*QG*QH + WB* /QA* /QB* /QC* /QD*QE*QF*QG*QH + WB*
                 WA
    QB := INIT*WA + /INIT* /WB* /WA*QA* /QB* /QC* /QD* /QE* /QF* /QG* /QH + INIT
                  WB + WA* /QA* /QB* /QC* /QD* /QE* /QF*QG*QH + WB* /QA* /QB* /QC*
                  /QD*QE*QF*QG*QH + WB*WA

QC := /INIT* /WB* /WA* /QA*QE* /QC* /QD* /QE* /QF* /QG* /QH + /INIT*WA*QA*
                  QB* /QC* /QD* /QE* /QF* /QG* /QH + INIT*WB + WB* /QA* /QE* /QC* /QD*
                  QE*QF*QG*QH + WB*WA
    QD := /INIT* /WB* /WA* /QA* /QB*QC* /QD* /QE* /QF* /QG* /QH + /INIT*WA*QA*
                  QB* /QC* /QD* /QE* /QF* /QG* /QH + INIT*WB + WB* /QA* /QE* /QC* /QD*
                  QE*QF*QG*QH + WB*WA
    QE := /INIT* /WB* /WA* /QA* /QB* /QC*QD* /QE* /QF* /QG* /QH + /INIT*WA*
                  /QA* /QB*QC*QD* /QE* /QF* /QG* /QH + /INIT*WB*QA*QB*QC*QD* /QE* /QF*
                  /QG* /QH + WB*WA
    QF := /INIT* /WB* /WA* /QA* /QB* /QC* /QD*QE* /QF* /QG* /QH + /INIT*WA*
                  /QA* /QB*QC*QD* /QE* /QF* /QG* /QH + /INIT*WB*QA*QB*QC*QD* /QE* /QF*
                  /QG* /QH + WB*WA
    QG := /INIT* /WB* /WA* /QA* /QB* /QC* /QD* /QE*QF* /QG* /QH + /INIT*WB*QA*
                  QB*QC*QD* /QE* /QF* /QG* /QH + /INIT*WA* /QA* /QB* /QC* /QD*QE*QF* /QG
                  /QH + WB*WA
    QH := /INIT* /WB* /WA* /QA* /QB* /QC* /QD* /QE* /QF*QG* /QH + /INIT*WB*QA*
                  QB*QC*QD* /QE* /QF* /QG* /QH + /INIT*WA* /QA* /QB* /QC* /QD*QE*QF*
                  /QG* /QH + WB*WA
```
II. BOOLEAN EQUATIONS DEFINING THE USE OF THE INPUT DATA CONTROL LOGIC:

```
    GR0 = -(G1).
    GR1 = -(-WB* -WA + M0 + G1).
    GR2 = -(-WB + M1 + G1).
    GR3 = -(M2 + -WB + G1).
    GR4 = -(-WA + M3 + -WB + G1).
    GR5 = -(-WA + -WB + G1).
    GR6 = -(-WA + -WB + G1).
    GR7 = -(-WA + -WB + G1).
```

TRUTH TABLE

```
    7-INPUT VARS       12-OUTPUT VARS        28-CUBES
==================
          GGGGGGGG
 GWWMMMM  RRRRRRRR
 1BA3210  01234567
 0110000  00000000
 010X000  00001111
 001XXX0  00111111
 000XXXX  01111111
 1XXXXXX  11111111
 0111000  00001000
 0110100  00010000
 010X100  00011111
 0111100  00011000
 0110010  00100000
```

```
010X010 00101111
0111010 00101000
0110110 00110000
010X110 00111111
0111110 00111000
0110001 01000000
010X001 01001111
001YXX1 01111111
0111001 01001000
0110101 01010000
010X101 01011111
0111101 01011000
0110011 01100000
010X011 01101111
0111011 01101000
0110111 01110000
010X111 01111111
0111111 01111000
```

EQUATIONS USED TO GENERATE FILE WHICH IS USED TO PROGRAM THE PAL.

NOTE:
OUTPUT GR0 OF THE ABOVE EQUATIONS = /GR0 OF THE BELOW EQUATIONS.
OUTPUT GR1 OF THE ABOVE EQUATIONS = /GR1 OF THE BELOW EQUATIONS.
OUTPUT GR2 OF THE ABOVE EQUATIONS = /GR2 OF THE BELOW EQUATIONS.
OUTPUT GR3 OF THE ABOVE EQUATIONS = /GR3 OF THE BELOW EQUATIONS.
OUTPUT GR4 OF THE ABOVE EQUATIONS = /GR4 OF THE BELOW EQUATIONS.
OUTPUT GR5 OF THE ABOVE EQUATIONS = /GR5 OF THE BELOW EQUATIONS.
OUTPUT GR6 OF THE ABOVE EQUATIONS = /GR6 OF THE BELOW EQUATIONS.
OUTPUT GR7 OF THE ABOVE EQUATIONS = /GR7 OF THE BELOW EQUATIONS.

EQUATIONS ARE FOR USE WITH THE "PALASM" PROGRAM SUGGESTED BY
MONOLITHIC MEMORIES, INC., AND ARE IN THE REQUIRED FORMAT.
PAL TYPE: PAL16L8
PIN LIST:
 1  2  3  4  5  6  7  8  9 10 11 12   13    14    15    16    17    18    19 20
 W9 WA M0 M1 M2 M3 G1 NC NC GND NC /GR7 /GR6 /GR5 /GR4 /GR3 /GR2 /GR1 /GR0 VCC
EQUATIONS:
IF (VCC) GR0 = G1
IF (VCC) GR1 = /WB+ /WA + M0 + G1
IF (VCC) GR2 = /WB + M1 + G1
IF (VCC) GR3 = M2 + /WB + G1
IF (VCC) GR4 = /WA + M3 + /WB + G1
IF (VCC) GR5 = /WA + /WB + G1
IF (VCC) GR6 = /WA + /WB + G1
IF (VCC) GR7 = /WA + /WB + G1

NOTE:
INPUTS M0, M1, M2, AND M3 ARE GROUNDED FOR THIS DESIGN.
III. BOOLEAN EQUATIONS DEFINING OUTPUTS OF THE DATA MAPPING LOGIC:

DF1 = -(-INIT* -WB*WA* -BF1* -BF3).
    DF2 = -(-INIT* -WB*WA*BF1* -BF3* -BF2 + -INIT*WB* -WA* -BF1* -BF3* -BF2).
    DF3 = -(-INIT* -WB*WA* -BF1* -BF3*BF2 + -INIT*WB* -WA* -BF1* -BF3* -BF2).

TRUTH TABLE

6-INPUT VARS          3-OUTPUT VARS         13-CUBES
    ============
    I
    N  BBB  DDD
    IWWFFF FFF
    TBA132 123

X11XXX 000
    X1X1XX 000
    XX01XX 000
    XXXX1X 000
    X00XXX 000
    XXX1X1 000
    1XXXXX 000
    X1XXX1 000
    XX0XX1 000
```

```
001000 100
001100 010
001001 101
010000 011
```

EQUATIONS USED TO GENERATE FILE WHICH IS USED TO PROGRAM THE PAL.

NOTE:
OUTPUT OF1 OF THE ABOVE EQUATIONS = /BF1 OF THE BELOW EQUATIONS.
OUTPUT OF2 OF THE ABOVE EQUATIONS = /BF2 OF THE BELOW EQUATIONS.
OUTPUT OF3 OF THE ABOVE EQUATIONS = /BF3 OF THE BELOW EQUATIONS.

EQUATIONS ARE FOR USE WITH THE "PALASM" PROGRAM SUGGESTED BY
MONOLITHIC MEMORIES, INC., AND ARE IN THE REQUIRED FORMAT.
PAL TYPE: PAL16R4
PIN LIST:
1  2  3  4  5  6  7  8  9  10  11  12  13  14  15  16  17  18  19  20
C  M0 M1 WB WA /INIT G1 M2 M3 GND /OE NC NC NC /BF3 /BF2 /BF1 NC NC VCC
EQUATIONS:
BF1 := /INIT* /WB*WA* /BF1* /BF3
BF2 := /INIT* /WB*WA*BF1* /BF2* /BF3 + /INIT*WB* /WA* /BF1* /BF2* /BF3
BF3 := /INIT* /WB*WA* /BF1*BF2* /BF3 + /INIT*WB* /WA* /BF1* /BF2* /BF3

NOTE:
INPUTS M0, M1, M2, AND M3 ARE GROUNDED FOR THIS DESIGN.

What is claimed is:

1. A data storage system for efficiently storing data words of at least three different word widths comprising:
a plurality of storage locations each including first, second, third and fourth commonly addressed data storage buffers;
first, second, third and fourth data buses coupled to said first, second, third and fourth data storage buffers, respectively, at each storage location;
first means responsive to an input width signal indicating a relatively large width data word for transferring the large width data word from said first, second, third and fourth data buses directly to said first, second, third and fourth data storage buffers, respectively, at a selected storage location;
second means responsive to the input width signal indicating intermediate width data words for sequentially transferring a first intermediate width data word from a pair of said data buses to one pair of said data storage buffers, and for transferring a second intermediate width data word from said pair of data buses to the other pair of said data storage buffers at a selected storage location;
third means responsive to the input width signal indicating relatively small width data words for sequentially transferring small width data words from one of said data buses to each of said data storage buffers at a selected storage location; and
control means responsive to the input width signal and to a write increment signal for enabling only those of said data storage buffers to which data is being transferred.

2. A data storage system as defined in claim 1 wherein said second transfer means transfers intermediate width data words received on said first and second data buses and wherein said third transfer means transfers small width data words received on said first data bus.

3. A data storage system as defined in claim 2 wherein said second transfer means and said third transfer means collectively comprise,
a first inter-bus buffer for transferring data from said first data bus to said second data bus,
a second inter-bus buffer for transferring data from said first data bus to said third data bus,
a third inter-bus buffer for transferring data from said second data bus to said fourth data bus, and
means for simultaneously enabling said first and third inter-bus buffers to effect data transfer from said first data bus to said fourth data bus.

4. A data storage system as defined in claim 3 further including data mapping means responsive to said input width signal and to said write increment signal for enabling selected inter-bus buffers during data transfer to said data storage buffers.

5. A data storage system for efficiently storing data words of at least three different word widths comprising:
first, second, third and fourth commonly addressed data storge buffers;
first, second, third and fourth data buses coupled to said first, second, third and fourth data storage buffers, respectively;
first means for transferring a relatively large width data word from said first, second, third and fourth data buses directly to said first, second, third and fourth data storage buffers, respectively;
second means for transferring a first intermediate width data word from said first and second data buses to said first and second data storage buffers, respectively, and for transferring a second intermediate width data word from said first and second data buses to said third and fourth data storage buffers, respectively;
third means for transferring a first relatively small width data word from said first data bus to said first data storage buffer, for transferring a second small width data word from said first data bus to said second data storage buffer, for transferring a third small width data word from said first data bus to said third data storage buffer, and for transferring a fourth small width data word from said first data bus to said fourth data storage buffer; and
means for enabling only those of said data storage buffers to which data is being transferred.

6. A data storage system as defined in claim 5 wherein said second transfer means and said third transfer means collectively comprise, a first inter-bus buffer for transferring data from said first data bus to said second data bus, a second inter-bus buffer for transferring data from said first data bus to said third data bus, a third inter-bus buffer for transferring data from said second data bus to said fourth data bus, and means for simultaneously enabling said first and third inter-bus buffers to effect data transfer form said first data bus to said fourth data bus.

7. A data storage system for efficiently storing data words of at least three different word widths comprising:

multiple storage locations each including a plurality of commonly-addressed data storage element sets;

a like plurality of data buses coupled to said plurality of data storage element sets, respectively, at each of said multiple storage locations;

first means responsive to an input width signal indicating a relatively large width data word for transferring the large width data word directly from said plurality of data buses to said plurality of data storage element sets at an addressed storage location;

second means responsive to the input width signal indicating intermediate width data words for sequentially transferring intermediate width data words from a group of data buses to first and second groups of said data storage element sets at an addressed storage location;

third means responsive to the input width signal indicating relatively small width data words from one of said data transferring small width data words from one of said data buses to third, fourth and fifth groups of data storage element sets at an addressed storage location; and control means responsive to the input width signal and to a write increment signal for enabling only those of said data storage element sets to which data is being transferred.

* * * * *